United States Patent
Tenenbaum

[15] 3,679,912
[45] July 25, 1972

[54] OVERVOLTAGE-UNDERVOLTAGE SENSOR

[72] Inventor: Mircea M. Tenenbaum, New Haven, Conn.

[73] Assignee: Allied Control Company, Inc., Plantsville, Conn.

[22] Filed: June 9, 1971

[21] Appl. No.: 151,190

[52] U.S. Cl. ..........................................307/235, 307/252 F
[51] Int. Cl. ..........................................................H03k 5/20
[58] Field of Search ......................................307/235, 252 F

[56] References Cited

UNITED STATES PATENTS

| | | | |
|---|---|---|---|
| 3,099,000 | 7/1963 | Dunning | 307/235 X |
| 3,139,562 | 6/1964 | Freeborn | 307/235 X |
| 3,354,448 | 11/1967 | Brolin | 307/235 X |

Primary Examiner—John Zazworsky
Attorney—McCormick, Paulding & Huber

[57] ABSTRACT

A voltage sensitive device controls the energization of a relay or other load so as to switch it between energized and de-energized states as the sensed voltage passes a low or undervoltage limit and another high or overvoltage limit. Detection of the high and low limits is achieved by two voltage detecting circuits, one for each limit, and a comparator circuit responsive to the outputs of the detecting circuits performs the actual switching of the load between its energized and de-energized states. The two detecting circuits and the comparator circuit are each comprised principally of a programmable unijunction transistor or other three-terminal semiconductor device of generally similar characteristics.

17 Claims, 3 Drawing Figures

INVENTOR.
MIRCEA M. TENENBAUM
BY
McCormick, Paulding & Huber
ATTORNEYS

OVERVOLTAGE-UNDERVOLTAGE SENSOR

BACKGROUND OF THE INVENTION

This invention relates to devices for controlling the energization of relays or other electrically energized controlled elements or loads in accordance with the value of a particular sensed voltage, and deals more particularly with such a device in the nature of an undervoltage-overvoltage sensor whereby the controlled element is held in one state of energization when the sensed voltage is under a given low-limit voltage or over a given high-limit voltage and is held in its other state of energization when the sensed voltage is of a value falling between such high and low limits.

In many instances it is desired to control the energization of a relay or the like in such a manner that it is held in one state of energization only when a given sensed voltage falls between predetermined high and low limits. For example, in the case of a relay, it is often desired to have the relay energized when the sensed voltage is of a value falling between the high and low limits and de-energized when the sensed voltage is below the low limit or above the high limit. Assuming this to be the case, a device accomplishing the desired control function should detect the applied voltage and when the voltage is below the low limit should hold the relay in a de-energized state. As the applied voltage rises to the low limit, the device should switch the relay to its energized state and the relay should be held in its energized state until the applied voltage rises to and reaches the high limit at which time the device should operate to switch the relay to its de-energized state and to hold the relay in such de-energized state as the applied voltage rises above the high limit. As the applied voltage falls from a point above the high limit a device performing the function of this invention should operate in the reverse manner to switch the relay from its de-energized to its energized state as the applied voltage falls to the high limit and to then again switch the relay from its energized to its de-energized state as the applied voltage reaches and passes the low limit.

Various devices for performing the above-described function have been proposed and used in the past, however, most of those which have been made available use one or more relays as part of the control system, together with an associated electronic circuit, and are otherwise relatively expensive and complicated.

The general purpose of this invention is to provide an improved and simple overvoltage-undervoltage sensor which performs the above-described function with the use of only a few inexpensive components and which device is highly flexible with regard to adjustment of the high and low limits of the voltage band to which it is sensitive.

SUMMARY OF THE INVENTION

This invention resides in a voltage sensitive device, sometimes referred to as an undervoltage-overvoltage sensor, for switching a relay or other controlled element between de-energized and energized states as the voltage applied to the device passes, in either direction, two separate high and low limit voltages. Low-level and high-level detecting circuits sense the applied voltages and produce output voltages indicative of whether the applied voltage is above or below the associated limit voltage, and a comparator circuit connected to the outputs of the detecting circuits controls the actual energization of the controlled element. The two detecting circuits each are comprised of a programmable unijunction transistor, or similar three-terminal semiconductor device, having its anode connected to the intermediate point of an associated voltage divider connected across the input terminals of the device, and having its gate connected to a reference voltage so that when the anode voltage rises to a level bearing a given ratio to the gate voltage the semiconductor device is switched from a non-conducting to a conducting state. The comparator circuit also preferably consists of a programmable unijunction transistor, or similar three-terminal semiconductor device, having its anode and gate connected respectively to the outputs of the low and high limit detectors so as to be held in a conducting state only when the semiconductor devices of the two detecting circuits are both in conducting states. The relay or other controlled device may be connected in series with the comparator circuit so as to be directly energized by the anode-cathode voltage of its semiconductor device, or it may be coupled to the comparator circuit through one or more stages of amplification.

DETAILED DESCRIPTION OF THE INVENTION

Figure 1:
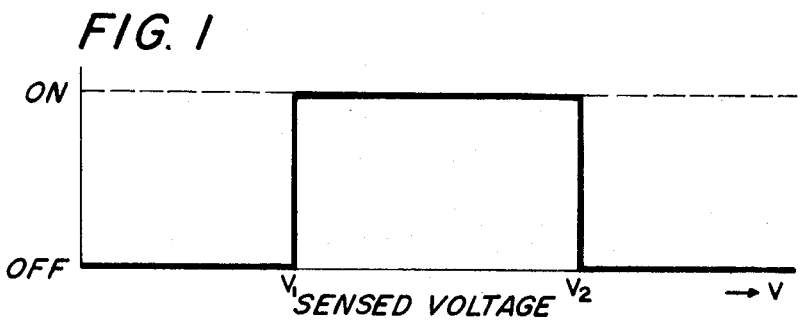
FIG. 1 is a diagram showing the function of a device embodying this invention.

Turning now to the drawings, and first considering FIG. 1, this figure shows the type of function which the device of this invention is intended to perform. It is assumed in this figure that the controlled device is a relay which is switched between off and on, or de-energized and energized, conditions as a particular sensed voltage V varies in value. More particularly, $V_1$ represents a low limit of the sensed voltage and $V_2$ represents a high limit of such voltage. When the sensed voltage is less than the low limit $V_1$ the relay is held in its off condition. As the sensed voltage rises to and reaches the low limit $V_1$ the relay is switched rapidly to its on condition. As the sensed voltage rises beyond the low limit $V_1$ the relay remains in its on condition until the sensed voltage reaches the high limit voltage $V_2$, at which point the relay is rapidly switched to its off condition. Thereafter as the sensed voltage increases beyond the high limit the relay remains in its off condition. As the sensed voltage falls from a value higher than the high limit voltage $V_2$ the reverse form of switching takes place. That is, when the high limit $V_2$ is reached the relay is switched from its off to its on condition and thereafter when the low limit voltage $V_1$ is reached the relay is switched from its on to its off condition. It will, of course, be understood that the device of this invention may be used to control the energization of other controlled elements or loads besides relays and that if desired, by the use of inverters, the energization scheme of the controlled element may be the inverse of that shown in FIG. 1.

Figure 2:
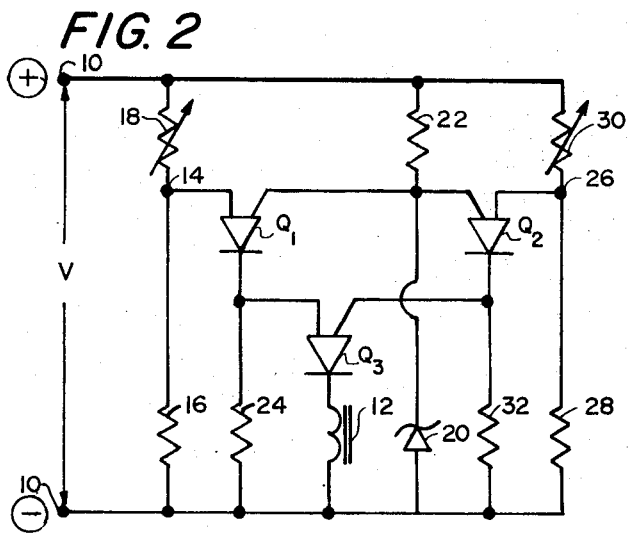
FIG. 2 is a schematic wiring diagram illustrating a device embodying this invention.

Turning now to FIG. 2, this figure illustrates in schematic form a device comprising one embodiment of this invention. In general, the device includes a low-level detecting circuit connected across its input terminals 10, 10 and operable to switch from one condition to another as the applied voltage passes the low limit, a high-level detecting circuit also connected across its input terminals 10, 10 and operable to switch from one condition to another as the applied voltage passes the high limit, and a comparator circuit connected with the outputs of the two detecting circuits for energizing and de-energizing the controlled element in response to changes in the combination of voltages appearing at the outputs of the two detecting circuits. The controlled element in this case is shown to be a relay 12.

The low-level detecting circuit of the device of FIG. 2 includes a three-terminal semiconductor device $Q_1$ which is a pnpn structure and which is of the kind called both a programmable unijunction transistor and a complementary SCR. In cases where the device is designed and intended mainly for applications where it replaces and functions generally similarly to a conventional unijunction transistor it is most often referred to as a programmable unijunction transistor. In the illustrated application the device $Q_1$, as well as the devices $Q_2$ and $Q_3$ hereinafter mentioned, do function generally similar to unijunction transistors and are therefore referred to herein as programmable unijunction transistors or PUTs. For a more detailed understanding of programmable unijunction transistors, reference may be had to General Electric Application Note No. 90.70–11/67 entitled "The D13T–A Programmable Unijunction Transistor." It should also be understood that in its broader aspects the invention is not limited to the illustrated semiconductor devices $Q_1$, $Q_2$ and $Q_3$ being PUTs, but that if desired they could also be conventional unijunction transistors or other three-terminal semiconductor device of the type which with regard to a first two of its terminals has non-conducting and conducting states and which switches from the non-conducting state to the conducting state when the voltage applied across its said first two terminals rises relative to the voltage applied to its third terminal to a point, the intrinsic standoff point, at which the voltage across the first two terminals equals the voltage applied to the third terminal times a certain proportionality factor, the intrinsic standoff ratio.

The anode of the PUT $Q_1$ is connected to an intermediate point 14 of a voltage divider connected across the input terminals 10, 10, the divider consisting of a fixed resistance 16 and a variable resistance 18. A reference voltage is applied to the gate of $Q_1$ by a zener diode 20 connected between the negative terminal 10 and the gate and a resistance 22 connected between the gate and the positive terminal 10. The cathode of $Q_1$ is connected to the negative terminal 10 through a dropping resistance 24, the side of the resistance opposite from the negative terminal 10 constituting the output terminal of the low-level detecting circuit. The zener diode 20 and resistance 22 are so selected that the reference voltage applied to the gate of $Q_1$ is substantially less than the minimum low-limit voltage $V_1$ to which the device is to be sensitive, and by adjusting the adjustable resistor 18 the low-limit voltage $V_1$ may be set to various different values. Therefore, when the applied voltage V rises to and reaches the low-limit voltage $V_1$ the voltage applied to the anode of $Q_1$ reaches the intrinsic standoff point relative to the reference voltage applied to its gate and $Q_1$ is switched to its conducting state.

The high-limit detector of the device of FIG. 2 is generally similar to that of the low-limit detector and comprises a PUT $Q_2$ having its anode connected to the intermediate point 26 of another voltage divider connected across the input terminals 10, 10 and consisting of a fixed resistance 28 and a variable resistance 30. The gate of $Q_2$ is connected to the cathode of the zener diode 20 so as to receive the same reference voltage as $Q_1$, and the cathode of $Q_2$ is connected to the negative terminal 10 through a dropping resistance 32, the side of the resistance 32 opposite from the negative terminal 10 constituting the output terminal of the high-level detecting circuit. The high-limit voltage $V_2$ is established by adjusting the variable resistor 30 and when the applied voltage V rises to and reaches the value $V_2$ the voltage applied to the anode of $Q_2$ reaches the intrinsic standoff point relative to its gate voltage and $Q_2$ is switched from its non-conducting to its conducting state causing current to flow through the dropping resistor 32.

The comparator circuit of the device of FIG. 2 consists of a third PUT $Q_3$ having its anode connected to the output terminal of the low-level detector, the positive side of the resistance 24, and its gate connected to the output terminal of the high-level detector, the positive side of the resistance 32. The cathode of $Q_3$ is connected to the negative input terminal 10 through the coil of the relay 12.

Considering the operation of the comparator circuit, when both $Q_1$ and $Q_2$ are non-conducting as a result of the applied voltage V being less than the low-limit voltage $V_1$ the anode, gate and cathode of $Q_3$ are all held at the negative voltage of the negative input terminal 10 and no conducting takes place through $Q_3$ or the relay 12. When the PUT $Q_1$ is switched to its conducting state, as a result of the applied voltage reaching the low-limit voltage $V_1$, a positive voltage is applied to the anode of $Q_3$ and, since the gate of $Q_3$ at this time has the voltage of the negative terminal 10 applied to it, $Q_3$ is switched to a conducting state and the relay 12 is energized. The relay 12 remains energized as the applied voltage rises until the applied voltage reaches the high-limit voltage $V_2$. At this time $Q_2$ is switched to its conducting state and a positive voltage is applied to the gate of $Q_3$. The values of the dropping resistors 24 and 32 and other related components are so chosen that this voltage applied to the gate of $Q_3$ is of a high level relative to the voltage applied to its anode and sufficient to switch $Q_3$ to its non-conducting state, thereby de-energizing the relay 12.

As the applied voltage falls from a high value greater than the high-limit voltage $V_2$ the reverse procedure takes place. That is, as the applied voltage reaches the high-limit voltage $V_2$, the PUT $Q_2$ of the high-level detecting circuit is switched to its non-conducting state thereby removing the gate voltage from $Q_3$ causing $Q_3$ to be switched to its conducting state and to energize the relay 12. When the applied voltage reaches the low-limit $V_1$, the PUT $Q_1$ of the low-level detector switched to its non-conducting state which removes the positive voltage from the anode of $Q_3$ and thereby returns $Q_3$ to its non-conducting state to de-energize the relay 12.

Figure 3:
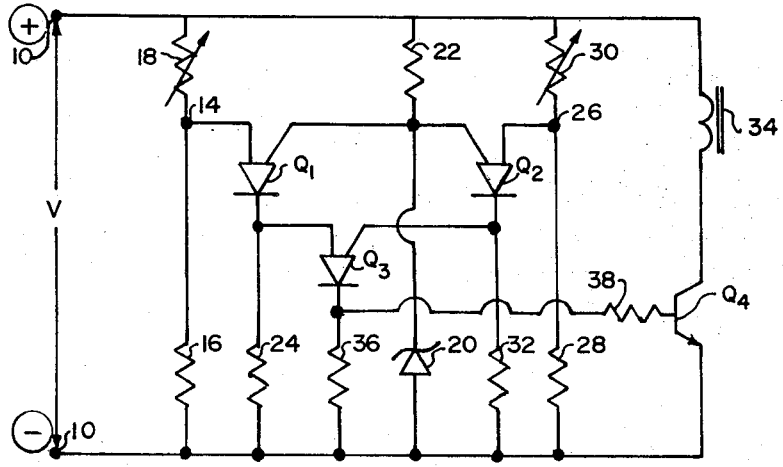
FIG. 3 is a schematic diagram illustrating a device comprising another embodiment of this invention.

In the device of FIG. 2 the relay 12 is directly energized by the cathode current of the comparator circuit PUT $Q_3$. If the power required by the controlled element is more than can be handled by the PUT $Q_3$, then the controlled element may be coupled with the comparator circuit through one or more stages of amplification. FIG. 3, for example, shows a device embodying the invention wherein the controlled element, in the form of a relay 34, is coupled with the comparator circuit through one stage of amplification. In FIG. 3 all of the components which are or may be identical to those of the device of FIG. 2 have been given the same reference numerals and need not be redescribed. The FIG. 3 device is identical to that of FIG. 2 except that the relay 12 of FIG. 2 is replaced by a dropping resistor 36 which supplies a signal to the amplifying circuit consisting of a transistor $Q_4$ and resistor 38.

It will also be noted that in the device of FIG. 3 the load current for the amplification stage is supplied from the same source, terminals 10,10, as the high and low level detecting circuits. This is not, however, essential to the invention and, if desired, the amplification stage or stages may be supplied with current from a different energy source, thereby increasing the capability of the device. The use of a separate source for the amplification stage or stages is, for example, often desirable in cases where the signal source supplying the input terminals 10,10 has a relatively high output impedance, that is does not have a sufficient output energy capability to satisfactorily meet the load requirement.

I claim:

1. A voltage sensitive device for switching a controlled element between de-energized and energized states as the voltage applied to said device passes two different voltage levels, said device comprising two input terminals across which the sensed voltage is applied, a low-level detecting circuit connected across said two input terminals, said low-level detecting circuit having an output terminal and being operable to cause the voltage appearing at said output terminal to be of one value when said applied voltage is below a predetermined low level and to be of a second value when said applied voltage is above said predetermined low level, a high-level detecting circuit connected across said two input terminals, said high-level detecting circuit having an output terminal and being operable to cause the voltage appearing at said latter output terminal to be of one value when said applied voltage is below a predetermined high level and to be of a second value when said applied voltage is above said predetermined high level, and a comparator circuit connected to both of said output terminals and to said controlled element for energizing and de-energizing said controlled element in response to changes in the combination of voltages appearing at said two output terminals, each of said detecting circuits including a three-terminal semiconductor device of the type which with regard to a first two of its terminals has non-conducting and conducting states and which switches from said non-conducting state to said conducting state when the voltage applied across said first two terminals rises relative to the voltage applied to its third terminal to a point at which said voltage across said first two terminals equals said voltage applied to said third terminal times a given proportionality factor, means for applying a proportion of said applied voltage to one of said first two terminals of each of said two semiconductor devices, two dropping resistances, and means connecting the other one of said first two terminals of each of said two semiconductor devices to one of said input terminals through a respective one of said dropping resistances the side of which resistance opposite from said one input terminal constitutes said output terminal of the associated detecting circuit, and means for applying a reference voltage to the third terminal of said semiconductor device of each of said detecting circuits.

2. A voltage sensitive device as defined in claim 1 further characterized by said comparator circuit including a third three-terminal semiconductor device of the type which with regard to a first two of its terminals has non-conducting and conducting states and which switches from said non-conducting state to said conducting state when the voltage applied across said first two terminals rises relative to the voltage applied to its third terminal to a point at which said voltage across said first two terminals equals said voltage applied to said third terminal times a given proportionality factor, said third semiconductor device having its third terminal connected to the output terminal of said high-level detecting circuit and means defining a circuit between the output terminal of said low-level detecting circuit and said one input terminal and passing through said first two terminals of said third semiconductor device which circuit is coupled with said controlled element so as to cause said controlled element to assume one of its said states when current passes through said latter circuit as a result of said third semiconductor being in a conducting state and to cause said controlled element to assume the other of its said states when no current flows through said latter circuit as a result of said third semiconductor device being in its non-conducting state.

3. A voltage sensitive device as defined in claim 2 further characterized by said latter circuit comprising means connecting one of said first two terminals of said third semiconductor device to said output terminal of said low-level detecting circuit and means connecting the other one of said two terminals of said third semiconductor device to said one input terminal through said controlled element.

4. A voltage sensitive device as defined in claim 2 further characterized by said latter circuit including means connecting one of said first two terminals of said third semiconductor device to the output terminal of said low-level detecting circuit and means connecting the other one of said first two terminals of said third semiconductor device to said one input terminal through a dropping resistance, and an amplification stage responsive to the voltage appearing across said latter dropping resistance for controlling the energization of said controlled element.

5. A voltage sensitive device as defined in claim 1 further characterized by said semiconductor devices of said two detecting circuits being programmable unijunction transistors.

6. A voltage sensitive device as defined in claim 2 further characterized by said two semiconductor devices of said two detecting circuits and said third semiconductor device of said comparator circuit all being programmable unijunction transistors.

7. A voltage sensitive device for switching a controlled element between de-energized and energized states as the voltage applied to said device passes two different voltage levels, said device comprising two input terminals across which the sensed voltage is applied, a low-level detecting circuit connected across said two input terminals, said low-level detecting circuit having an output terminal and being operable to cause the voltage appearing at said output terminal to be of one value when said applied voltage is below a predetermined low level and to be of a second value when said applied voltage is above said predetermined low level, a high-level detecting circuit connected across said two input terminals, said high-level detecting circuit having an output terminal and being operable to cause the voltage appearing at said latter output terminal to be of one value when said applied voltage is below a predetermined high level and to be of a second value when said applied voltage is above said predetermined high level, and a comparator circuit connected to both of said output terminals and to said controlled element for energizing and de-energizing said controlled element in response to changes in the combination of voltages appearing at said two output terminals, each of said detecting circuits including a voltage divider connected across said two input terminals and having an intermediate tap point, each of said detecting circuits further including a three-terminal semiconductor device which with regard to a first two of its terminals has non-conducting and conducting states and which switches from said non-conducting state to said conducting state when the voltage applied across said first two terminals rises relative to the voltage applied to its third terminal to a point at which said voltage across said first two terminals equals said voltage applied to said third terminal times a given proportionality factor, and each of said detecting circuits further including means connecting one of said first two terminals of said semiconductor device to said tap point of the associated voltage divider and means connecting the other one of said first two terminals of said semiconductor device to one of said input terminals through a dropping resistance the side of which resistance opposite from said one input terminal constitutes said output terminal for said detecting circuit, and means for applying a reference voltage to the third terminal of said semiconductor device of each of said detecting circuits.

8. A voltage sensitive device as defined in claim 7 further characterized by said means for applying a reference voltage to one of said two detecting circuits comprising a zener diode connected between said third terminal of said semiconductor device of said one detecting circuit and said one input terminal and a resistance connected between said third terminal of said latter semiconductor device and the other of said input terminals.

9. A voltage sensitive device as defined in claim 7 further characterized by said two semiconductor devices of said two detecting circuits having their third terminals connected to one another, and said means for applying a reference voltage to the third terminal of the semiconductor device of each of said detecting circuits comprising a zener diode connected between said two third terminals and said one input terminal and a resistance connected between said two third terminals and the other one of said input terminals whereby the same reference voltage is applied to both of said semiconductor devices.

10. A voltage sensitive device for switching a controlled element between de-energized and energized states as the voltage applied to said device passes two different voltage levels, said device comprising two input terminals across which the sensed voltage is applied, two programmable unijunction transistors, means connected with said two input terminals for applying a first proportion of said applied voltage to the anode of the first one of said two programmable unijunction transistors and for applying a second proportion of said applied voltage to the anode of the second one of said programmable unijunction transistors, said first programmable unijunction transistor having its cathode connected to the more negative one of said input terminals through a first dropping resistance and said second one of said programmable unijunction transistors having its cathode connected to said more negative one of said input terminals through a second dropping resistance, means for applying a reference voltage to the gate of each of said two programmable unijunction transistors, and a comparator circuit connected to the more positive sides of said two dropping resistances and to said controlled element for energizing and de-energizing said controlled element in response to changes in the combination of voltages appearing across said two dropping resistances.

11. A voltage sensitive device as defined in claim 10 further characterized by said comparator circuit comprising a third programmable unijunction transistor having its anode connected to the positive side of said first dropping resistance, having its gate connected to the positive side of said second dropping resistance, and having its cathode connected to said more negative one of said input terminals through a load circuit coupled with said controlled element.

12. A voltage sensitive device as defined in claim 11 further characterized by said load circuit including said controlled element connected in series with said cathode of said third programmable unijunction transistor and said more negative one of said input terminals.

13. A voltage sensitive device as defined in claim 11 further characterized by said load circuit including a third dropping resistance connected in series with said cathode of said third programmable unijunction transistor and said more negative one of said input terminals, and an amplification stage connected across said third dropping resistance for controlling the energization of said controlled element in response to the voltage appearing across said third dropping resistance.

14. A voltage sensitive device as defined in claim 10 further characterized by said means connected with said input terminals for applying a first proportion of said applied voltage to the anode terminal of the first one of said programmable unijunction transistors and for applying a second proportion of said applied voltage to the anode terminal of the second one of said programmable unijunction transistors comprising a first voltage divider connected across said two input terminals and having an intermediate tap point connected to the anode of said first programmable unijunction transistor and a second voltage divider connected across said two input terminals and having an intermediate tap point connected to the anode of said second programmable unijunction transistor.

15. A voltage sensitive device as defined in claim 14 further characterized by each of said two voltage dividers including one adjustable resistance whereby the proportion of the applied voltage supplied to the anode of the associated programmable unijunction transistor may be varied.

16. A voltage sensitive device as defined in claim 10 further characterized by said two programmable unijunction transistors having their gates connected to one another and said means for applying a reference voltage to the gate of each of said two programmable unijunction transistors comprising a zener diode connected between said two gates and the more negative one of said input terminals and a resistance connected between said two gates and the other of said input terminals whereby the same reference voltage is applied to both of said gates.

17. A voltage sensitive device for switching a controlled element between de-energized and energized states as the voltage applied to said device passes two different voltage levels, said device comprising two input terminals across which the sensed voltage is applied, two voltage dividers connected across said two input terminals, two programmable unijunction transistors each having its anode terminal connected to an intermediate tap point of a respective one of said voltage dividers, said first programmable unijunction transistor having its cathode connected to the more negative one of said input terminals through a first dropping resistance and said second one of said programmable unijunction transistors having its cathode connected to said more negative one of said input terminals through a second dropping resistance, said two programmable unijunction transistors having their gates connected directly to one another, a zener diode connected between said two gates and said more negative one of said input terminals and a resistance connected between said two gates and the other one of said input terminals so as to apply a common reference voltage to said two gates, and a third programmable unijunction transistor having its anode connected to the positive side of said first dropping resistance and its gate connected to the positive side of said second dropping resistance and having its cathode connected to said more negative one of said input terminals through a load circuit coupled with said controlled element.

* * * * *